3,282,849
GERMICIDAL CLEANSING COMPOSITION

Hans G. Diehn, North Olmstead, Ohio, and Donald J. Berenschot, Chicago, and James M. Willhoite, La Grange, Ill., assignors to Armour and Company, Chicago, Ill., a corporation of Delaware
No Drawing. Filed Apr. 5, 1961, Ser. No. 100,828
1 Claim. (Cl. 252—106)

The present invention relates to a process for increasing the viscosity of a water-containing liquid and to a cleansing composition.

A necessary or desirable condition of many products is that they be relatively thick or viscous. Examples of products in which such condition is an important characteristic would include hand lotions, hand creams, shaving creams, ointments, shampoos, heavy-duty detergents, waterless hand cleansers and the like. Certain industrial products such as a wire drawing material having the heavy metals suspended in solution require a thickening agent to maintain the suspension. While many thickening agents are known, not all of these are suitable for all uses or applications. For example, many of the thickening agents are not compatible with non-ionic detergents which might otherwise be used in a cleansing composition.

A principal object of our invention is to provide a process for increasing the viscosity of water-containing liquids. The process of our invention will permit the thickening of water-containing liquids having compounds therein with which compounds many of the presently available thickeners are incompatible.

A principal object of our invention is to provide a water-containing cleansing composition having an increased viscosity and a particularly effective anti-microbiological activity.

A further object and advantage of our invention is that the products produced in accordance with our invention have an anti-microbiological activity. In many compositions it is necessary or desirable that the composition have a bactericidal or germicidal activity. Examples would be shampoos, floor cleaning compounds, shaving creams and the like. In many such products, special ingredients are specifically included for such purpose. The use of our invention in producing such products will impart an anti-microbiological activity thereto. This activity may be alone sufficient to achieve the desired result or may be supplemented by the inclusion of other bactericidal or germicidal materials.

Further objects and advantages will become apparent from the following descriptions of our invention.

In accordance with our invention, the viscosity of a water-containing liquid may be thickened by mixing into that liquid a long-chain quaternary ammonium salt selected from the group consisting of the dodecyl benzyl chloride quaternary of N,N-dimethyloctadecylamine, the dodecenyl chloride quaternary of N,N-dimethyloctadecylamine, the propargyl chloride quaternary of N-methyl-N,-N di-(hydrogenated tallow)amine, the dodecenyl chloride quaternary of N,N-dimethyldodecylamine, and the dodecylbenzyl chloride quaternary of N-tallow tris-(hydroxyethyl)-trimethylenediamine. The amount of the long-chain quaternary ammonium salt which is added to the water-containing liquid to thicken the latter will depend upon the degree of viscosity desired for the finished product. The more of the long-chain quaternary ammonium salt that is added, the thicker will be the finished product and vice versa. The long-chain quaternary ammonium salts utilized in our invention may be produced substantially as disclosed in "Encyclopedia of Chemical Technology," Interscience Encyclopedia, Inc., New York (1953), vol. 11, pages 375–379.

Example I

A germicidal cleansing fluid suitable for use on floors, walls, furniture etc. has the following composition:

| | Percent |
|---|---|
| (1) Non-ionic detergent (100% active)—Nonylphenol plus 9 mols of ethylene oxide | 10.00 |
| (2) Detergent builder (60% active)—Di-sodium salt of N-(2-hydroxyethyl)-imino diacetic acid | 7.50 |
| (3) Germicide (50% active)—Tallow trimethyl ammonium chloride | 5.00 |
| (4) Thickener (65% active)—Dodecyl benzyl chloride quaternary of N,N dimethyloctadecylamine | 3.85 |
| (5) Dye for color (1% active)—Rhodamine solution | 0.25 |
| (6) Tap water | 73.40 |
| Total | 100.00 |

It is preferred that each of the components be added in the order listed above. This avoids extreme viscosity at any stage. After all of the components have been added, the product should be agitated until it is quite clear. No heat is required in the formulation. In some instances it will be desirable to adjust the pH to 9 with glacial acetic acid. The viscosity of the finished composition at 70° F. is 9.0 centipoises. This viscosity may be increased or decreased by more or less of the thickener. The percentages given in this example are by weight.

The germicidal effect of the cleansing fluid produced in accordance with Example I (that material hereinafter being designated as No. 1) is shown in the following tables. The tests performed were in accordance with AOAC Official Methods—8th edition, vol. 1955, using *S. aureus* No. 209 as the test organism.

TABLE 1.—PHENOL COEFFICIENTS OF CLEANSING FLUID NO. 1

[Temperature 20° C.]

| Phenol | 5′ | 10′ | 15′ | P.C. |
|---|---|---|---|---|
| 1–40 | 0 | 0 | 0 | |
| 1–50 | 0 | 0 | 0 | |
| 1–60 | + | 0 | 0 | |
| 1–70 | + | + | + | |
| #1  1 hr. at −20° F.: | | | | |
| 1–400 | + | 0 | 0 | |
| 1–450 | + | 0 | 0 | 7.5 |
| 1–500 | + | + | 0 | |
| 1–550 | + | + | 0 | |
| 1–600 | + | 0 | 0 | |
| #1  1 wk. at Room T.°: | | | | |
| 1–400 | + | 0 | 0 | |
| 1–450 | + | 0 | 0 | 8.3 |
| 1–500 | + | 0 | 0 | |
| 1–550 | + | + | 0 | |
| 1–600 | + | + | 0 | |
| #1  1 wk. at 40° F.: | | | | |
| 1–400 | + | 0 | 0 | |
| 1–450 | + | 0 | 0 | 9.1 |
| 1–500 | + | 0 | + | |
| 1–550 | + | 0 | 0 | |
| 1–600 | + | + | 0 | |
| #1  1 wk. at 110° F.: | | | | |
| 1–400 | 0 | 0 | 0 | |
| 1–450 | 0 | 0 | 0 | 7.5 |
| 1–500 | + | + | 0 | |
| 1–550 | + | + | 0 | |
| 1–600 | + | + | 0 | |
| #1  1 wk. at 140° F.: | | | | |
| 1–400 | + | 0 | 0 | |
| 1–450 | + | 0 | + | 8.3 |
| 1–500 | + | 0 | 0 | |
| 1–550 | + | + | 0 | |
| 1–600 | + | 0 | 0 | |
| #1  (pH 8) 1 wk. at 140° F.: | | | | |
| 1–400 | + | 0 | 0 | |
| 1–450 | + | 0 | 0 | 10 |
| 1–500 | + | 0 | 0 | |
| 1–550 | + | 0 | 0 | |
| 1–600 | + | 0 | + | |

+ = Growth.  0 = No growth.

The variations in the above coefficients are within the normal variations for the method and do not necessarily represent any activity differences in the samples.

TABLE 2.—DISINFECTION OF SURFACES WITH CLEANSING FLUID NO. 1

| No. of Broth Tubes | 1 oz. 1 Gal. $H_2O$ | 2 oz. 1 Gal. $H_2O$ |
|---|---|---|
| 1 | 0 | 0 |
| 2 | 0 | 0 |
| 3 | 0 | 0 |
| 4 | 0 | 0 |
| 5 | 0 | 0 |
| 6 | 0 | 0 |
| 7 | 0 | 0 |
| 8 | + | 0 |
| 9 | + | 0 |
| 10 | + | 0 |

+=Growth. 0=No growth.

The cleansing fluid of Example I is an exceptionally desirable germicide because, in addition to being a good germicide with a broad spectrum of activity, it will remain on the surfaces to which the cleansing fluid has been applied. The germicidal activity of the quaternary ammonium germicide is enhanced by the activity of the thickener.

Having selected the quaternary ammonium germicide, it is necessary to use a water-soluble non-ionic detergent therewith. In the past it has been impossible to thicken a cleansing fluid comprising these materials and obtain a stable product. The commercially available thickeners were incompatible with the cleansing fluids so produced and instability resulted. However, through the use of the present invention, the cleansing fluid may be thickened to any desired degree.

The specific thickener named in this example may be replaced by any of the four other long-chain quaternary ammonium salts hereinbefore identified. Another quaternary ammonium germicide that will work just as effectively in the foregoing formulation as will the tallow trimethyl ammonium chloride is soya trimethyl ammonium chloride.

*Example II*

An oil in water emulsion was prepared by agitating the following components:

Kerosene, cc. _____ 10
Hydrochloric acid aqueous solution (10% active), cc. _____ 90
Propargyl chloride quaternary of N-methyl-N, -N di-hydrogenated tallow amine (100% active), grams _____ 1

*Example III*

An oil in water emulsion was prepared by agitating the following components:

Kerosene, cc. _____ 10
Hydrochloric acid aqueous solution (10% active), cc. _____ 90
Dodecenyl chloride quaternary of N,N dimethyl dodecylamine (100%), grams _____ 1

*Example IV*

An oil in water emulsion was prepared by agitating the following components:

Kerosene, cc. _____ 10
Hydrochloric acid aqueous solution (10% active), cc. _____ 90
Dodecylbenzyl chloride quaternary of N-tallow tris-(hydroxyethyl) - trimethylenediamine (100%), grams _____ 1

*Example V*

An oil in water emulsion was prepared by agitating the following components:

Kerosene, cc. _____ 10
Hydrochloric acid aqueous solution (10% active), cc. _____ 90
Dodecenyl chloride quaternary of N,N dimethyl octadecylamine (100%), grams _____ 1

The emulsions prepared in accordance with Examples II through V all demonstrate the use of the thickeners for our invention in an acid, petroleum oil environment such as is found in the use of fracturing fluids for oil wells. In each instance the emulsion was thickened by the inclusion of the named long-chain quaternary ammonium salt included in the compound of the example. For instance, in the case of the emulsion produced in accordance with Examples IV and V, the emulsions were capable of suspending 12 grams of sand, at a temperature of 150° F., for a time period of one to ninety minutes.

*Example VI*

One percent of dodecyl benzyl chloride quaternary of N,N dimethyl octadecylamine was mixed into distilled water and a jell resulted. The viscosity of the distilled water can be increased or decreased by increasing or decreasing the percentage of the long-chain quaternary ammonium salt with respect to the amount of water employed. Viscosities varying from a cream to a paste may be obtained as a result of the amount of long-chain quaternary ammonium salt employed.

The foregoing description of specific examples is for the purpose of illustration and complying with 35 U.S.C. 112 and should not be construed as imposing unnecessary limitations upon the appended claims inasmuch as modifications and variations thereof will be apparent to those skilled in the art.

We claim:

A cleansing composition consisting essentially of water; a water soluble non-ionic detergent; and a long-chain quaternary ammonium salt selected from the group consisting of the dodecyl benzyl chloride quaternary of N,N dimethyloctadecylamine, the dodecenyl chloride quaternary of N,N dimethyloctadecylamine, the propargyl chloride quaternary of N-methyl-N, -N di-(hydrogenated tallow)amine, the dodecenyl chloride quaternary of N,N-dimethyldodecylamine, and the dodecylbenzyl chloride quaternary of N-tallow tris-(hydroxyethyl)-trimethylenediamine, said quarternary ammonium salt being present in an amount sufficient to thicken said cleansing composition.

References Cited by the Examiner

UNITED STATES PATENTS

| | | | |
|---|---|---|---|
| 2,295,504 | 9/1942 | Shelton _____ | 252—357 XR |
| 2,398,295 | 4/1946 | Epstein et al. ____ | 252—357 XR |
| 2,577,773 | 12/1951 | Lambert _____ | 252—106 XR |
| 2,676,986 | 4/1954 | Wakeman _____ | 252—357 XR |
| 2,940,902 | 6/1960 | Vorsatz _____ | 252—316 XR |
| 3,044,962 | 7/1962 | Brunt et al. _____ | 252—106 XR |
| 3,050,521 | 8/1962 | Niederhauser ___ | 252—106 XR |
| 3,079,345 | 2/1963 | Monroe et al. ___ | 252—146 XR |

LEON D. ROSDOL, *Primary Examiner.*

JULIUS GREENWALD, ALBERT T. MEYERS, *Examiners.*

H. A. EDELMAN, W. SCHULZ, *Assistant Examiners.*